(12) United States Patent
Lee et al.

(10) Patent No.: US 7,646,978 B2
(45) Date of Patent: Jan. 12, 2010

(54) METHODS AND APPARATUSES TO PROVIDE A WAVELENGTH DIVISION-MULTIPLEXING PASSIVE OPTICAL NETWORK BASED ON WAVELENGTH-LOCKED WAVELENGTH-DIVISION-MULTIPLEXED LIGHT SOURCES

(75) Inventors: Chang-Hee Lee, Taejon (KR); Kwang-Uk Chu, Taejon (KR); Tae-Won Oh, Taejon (KR)

(73) Assignee: Novera Optics, Inc., Santa Clara, CA (US)

( * ) Notice: Subject to any disclaimer, the term of this patent is extended or adjusted under 35 U.S.C. 154(b) by 473 days.

(21) Appl. No.: 10/502,166

(22) PCT Filed: Jan. 21, 2003

(86) PCT No.: PCT/US03/01782

§ 371 (c)(1),
(2), (4) Date: Jul. 20, 2004

(87) PCT Pub. No.: WO03/063401

PCT Pub. Date: Jul. 31, 2003

(65) Prior Publication Data

US 2005/0163503 A1  Jul. 28, 2005

(30) Foreign Application Priority Data

Jan. 21, 2002  (KR) .................... 10-2002-0003318

(51) Int. Cl.
*H04B 10/20* (2006.01)
*H04B 10/00* (2006.01)
*H04J 14/08* (2006.01)

(52) U.S. Cl. ............................ 398/63; 398/95; 398/168

(58) Field of Classification Search ................... 398/63, 398/72, 90, 94, 95, 168
See application file for complete search history.

(56) References Cited

U.S. PATENT DOCUMENTS

| 4,341,438 | A | | 7/1982 | Seki et al. |
| 5,221,983 | A | * | 6/1993 | Wagner ....................... 398/72 |
| 5,589,970 | A | | 12/1996 | Lyu et al. |

(Continued)

FOREIGN PATENT DOCUMENTS

EP  0 688 114 A  12/1995

(Continued)

OTHER PUBLICATIONS

Kartalopoulos, S. V. Introduction to DWDM Technology: Data in a Rainbow. NJ. IEEE Press, 2000. p. 56-57.*

(Continued)

*Primary Examiner*—Nathan M Curs
(74) *Attorney, Agent, or Firm*—Blakely, Sokoloff, Taylor & Zafman LLP

(57) ABSTRACT

Various methods, systems, and apparatuses in which a wavelength-division-multiplexing passive-optical-network includes a first broadband light source and a second broadband light source. The first broadband light source supplies an optical signal containing a first band of wavelengths to a first plurality of optical transmitters. The second broadband light source supplies an optical signal containing a second band of wavelengths to a second plurality of optical transmitters. A fiber is used for bi-directional transmission of optical signals in at least two different wavelength bands.

36 Claims, 5 Drawing Sheets

U.S. PATENT DOCUMENTS

| | | | | |
|---|---|---|---|---|
| 5,864,414 | A * | 1/1999 | Barnsley et al. | 398/71 |
| 5,920,414 | A * | 7/1999 | Miyachi et al. | 398/14 |
| RE36,471 | E | 12/1999 | Cohen | |
| 6,597,482 | B1 | 7/2003 | Chung et al. | |
| 6,941,074 | B2 * | 9/2005 | Nakamura et al. | 398/92 |
| 7,106,974 | B2 * | 9/2006 | Lee et al. | 398/168 |
| 2001/0004290 | A1 * | 6/2001 | Lee et al. | 359/124 |
| 2003/0128917 | A1 * | 7/2003 | Turpin et al. | 385/24 |
| 2003/0205706 | A1 * | 11/2003 | Lin et al. | 257/15 |
| 2007/0014509 | A1 * | 1/2007 | Kish et al. | 385/14 |

FOREIGN PATENT DOCUMENTS

| | | |
|---|---|---|
| EP | 0 972 367 A | 1/2000 |
| GB | 2 122 371 A | 1/1984 |
| JP | 8-163097 | 6/1996 |
| JP | 10-23478 | 1/1998 |
| JP | 2000-196536 | 7/2000 |
| JP | 2001-230733 | 8/2001 |
| JP | 2001-257658 | 9/2001 |
| WO | WO 00/05788 | 2/2000 |
| WO | WO 00/10271 | 2/2000 |

OTHER PUBLICATIONS

Derek Mayweather, et al., "Wavelength Tracking of a Remote WDM Router in a Passive Optical Network," XP 000624886, IEEE Photonics Technology Letters, vol. 8, No. 9, pp. 1238-1240 (Sep. 1996).

Robert D. Feldman, et al., "An Evaluation of Architectures Incorporating Wavelength Division Multiplexing for Broad0Band Fiber Access," Journal of Lightwave Technology, vol. 16, No. 9, pp. 1546-1559 (Sep. 1998).

Hyun Deok Kim, et al., "A Low-Cost WDM Source with an ASE Injected Fabry-Perot Semiconductor Laser," IEEE Photonics Technology Letters, vol. 12, No. 8, pp. 1067-1069 (Aug. 2000).

P. Healey, et al., "Spectral Slicing WDM-PON Using Wavelength-Seeded Reflective SOAs," Electronics Letters, vol. 37, No. 19, pp. 1181-1182 (Sep. 13, 2001).

Qiao Yaojun, et al., "A New Scheme for WDM-Based Passive Optical Access Network," 4 pgs. (2000).

Database WPI, Section E1, Week 200111, Derwent Publications Ltd., London, GB, AN 2001-098850, XP002276043.

Patent Cooperation Treaty's Written Opinion for International application No. PCT/US03/01782, dated Oct. 15, 2004, 6 pgs.

PCT Notification of Transmittal of The International Search Report or The Declaration for PCT Counterpart Application No. PCT/US03/01782 Containing International Search Report (Apr. 28, 2004).

* cited by examiner

METHODS AND APPARATUSES TO PROVIDE A WAVELENGTH DIVISION-MULTIPLEXING PASSIVE OPTICAL NETWORK BASED ON WAVELENGTH-LOCKED WAVELENGTH-DIVISION-MULTIPLEXED LIGHT SOURCES

RELATED APPLICATIONS

This application is a National Phase Application of International Application No. PCT/US03/01782, filed on Jan. 21, 2003, which claims the benefit of South Korean Patent Application entitled "Wavelength-division-multiplexing passive optical network based on wavelength-locked wavelength-division-multiplexed light sources through injected incoherent light," Serial No. 2002-3318, filed Jan. 21, 2002. The present application claims priority to both International Application No. PCT/US03/01782, filed Jan. 21, 2003, and South Korean Patent Application Serial No. 2002-3318, filed Jan. 21, 2002.

FIELD

Embodiments of this invention relate to wavelength-division-multiplexing passive-optical-networks. More particularly, an aspect of an embodiment of this invention relates to wavelength-division-multiplexing passive-optical-networks using wavelength-locked light sources through injected incoherent light.

BACKGROUND

Some wavelength-division-multiplexing-passive-optical-networks require precise wavelength alignment between the wavelengths of the signal from a transmitter in a central office to a device in a remote site distributing that signal to a subscriber. In a passive-optical-network, a remote node containing the signal-distributing device is typically located outdoors without any electrical power supply. The transmission wavelength of the outdoor signal-distributing device can change according to the variation of the external temperature. Misalignment of the wavelength between the transmitted signal and the operating wavelength of the device distributing the signal introduces extra insertion loss in the signal.

A possible way to minimize the misalignment can be to use a narrow-linewidth distributed feedback laser diode (DFB LD) as an optical transmitter to satisfy the wavelength alignment condition. However, this arrangement may not be an economic solution because of the high price of each DFB LD.

Another passive optical network may use a broadband light emitting diode (LED) as an optical transmitter. However, the modulation bandwidth of the LED can be narrow, thereby, making it difficult to send data at a high bit rate. Moreover, long-distance transmission in a passive optical network can be difficult with an LED due to the inherent weak power output from an LED.

Complex channel selection and temperature control circuits have been employed to compensate for the large insertion loss in optical signals passing through optical multiplexer/demultiplexers located in different locations. The operating wavelength of these devices can vary depending on the temperature of the device. However, the complexity of the channel selection circuit has the disadvantage that the complexity the circuit becomes greater and greater as the number of input ports of the circuit increases. Thus, the more channels being distributed by a multiplexer/demultiplexer, then the more complex and expensive the channel selection and temperature control circuit becomes.

SUMMARY

Various methods, systems, and apparatuses are described in which a wavelength-division-multiplexing passive-optical-network includes a first broadband light source and a second broadband light source. The first broadband light source supplies an optical signal containing a first band of wavelengths to a first plurality of optical transmitters. The second broadband light source supplies an optical signal containing a second band of wavelengths to a second plurality of optical transmitters. A fiber is used for bi-directional transmission of optical signals in at least two different wavelength bands.

Other features and advantages of the present invention will be apparent from the accompanying drawings and from the detailed description that follows below.

BRIEF DESCRIPTION OF THE DRAWINGS

The present invention is illustrated by example and not limitation in the figures of the accompanying drawings, in which like references indicate similar elements and in which.

DETAILED DESCRIPTION

In general, various wavelength-division-multiplexing passive-optical-networks are described. For an embodiment, the wavelength-division-multiplexing passive-optical-network includes a first broadband light source and a second broadband light source. The first broadband light source supplies an optical signal containing a first band of wavelengths to a first plurality of optical transmitters. One or more of the optical transmitters receive a spectrally sliced signal from the first band of wavelengths to align an operating wavelength of that optical transmitter to the wavelengths within the spectrally sliced signal. The second broadband light source supplies an optical signal containing a second band of wavelengths to a second plurality of optical transmitters. One or more of the optical transmitters receive a spectrally sliced signal in the second band of wavelengths and align an operating wavelength of that optical transmitter to the wavelengths within the spectrally sliced signal. A fiber is used for bi-directional transmission of optical signals in at least two different wavelength bands. Other features, aspects, and advantages of the present invention will be apparent from the accompanying drawings and from the detailed description that follows below.

Figure 1:
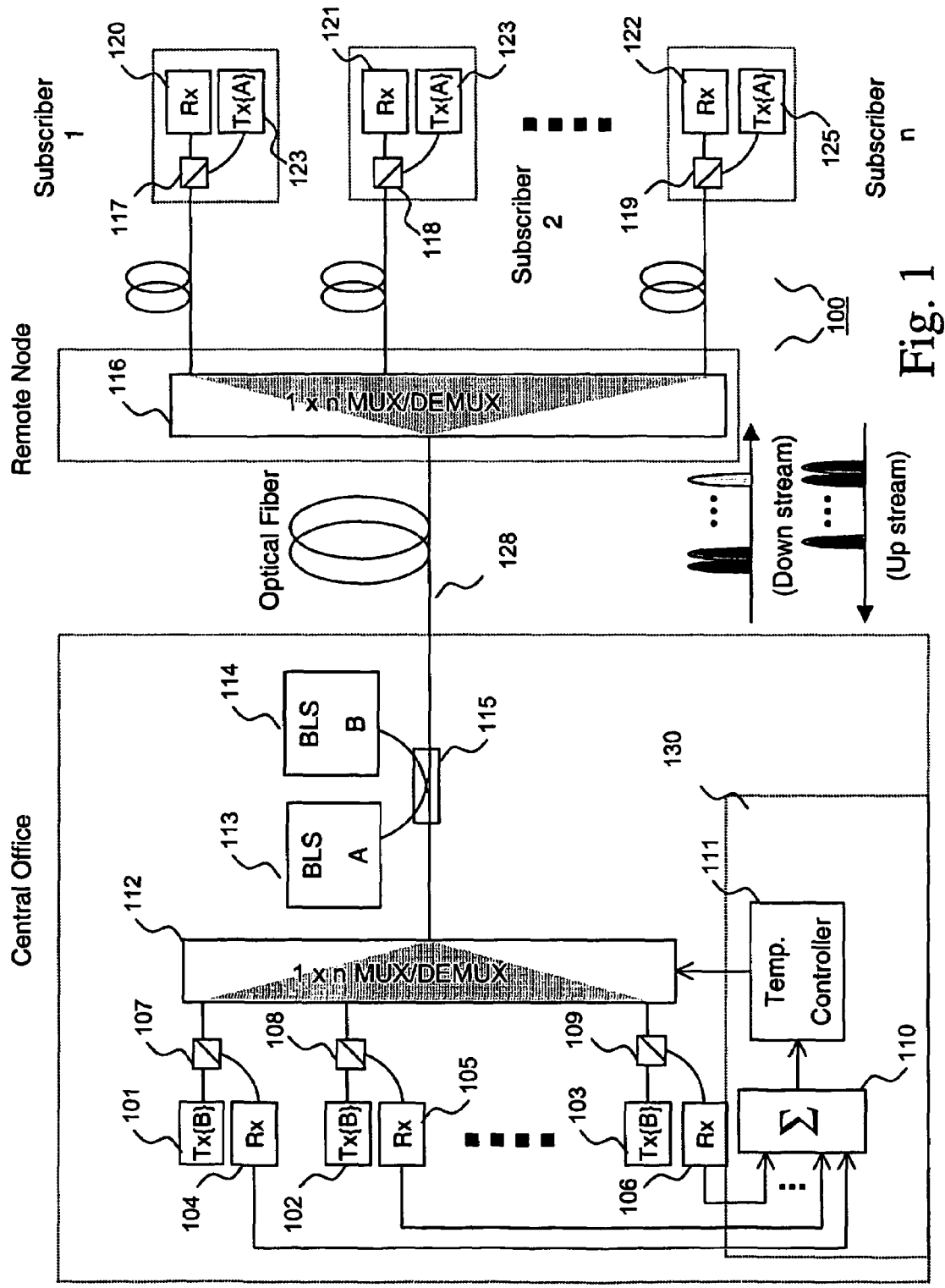
FIG. 1 illustrates a block diagram of an embodiment of a wavelength-division-multiplexing passive-optical-network based on wavelength-locked wavelength-division-multiplexed light sources.

FIG. 1 illustrates a block diagram of an embodiment of a wavelength-division-multiplexing passive-optical-network based on wavelength-locked wavelength-division-multiplexed light sources. The wavelength-division-multiplexing passive-optical-network 100 includes a first location such as a central office, a second location remote from the first location such as a remote node, and a plurality of subscriber locations.

The example central office contains a first group of optical transmitters 101-103 emitting optical signals in a first band of wavelengths, a first group of optical receivers 104-106 to accept an optical signal in a second band of wavelengths, a first group of band splitting filters 107-109, a wavelength-tracking component 130, a first 1×n bi-directional optical multiplexer/demultiplexer 112, a first broadband light source 114, and a second broadband light source 113.

The first optical multiplexer/demultiplexer 112 spectrally slices a first band of wavelengths received from the first broadband light source 114 and demultiplexes a second band of wavelengths received from the second optical multiplexer/demultiplexer 116. Each optical transmitter in the first group of optical transmitters 101-103 receives a discrete spectrally sliced signal in the first band of wavelengths and aligns the operating wavelength of that optical transmitter to the wavelengths within the received spectrally sliced signal.

Each optical receiver in the first group of optical receivers 104-106 receives a discrete demultiplexed signal in the second band of wavelengths. The first multiplexer/demultiplexer 112 couples to a first group of band splitting filters 107-109.

A band splitting filter, such as the first broadband splitting filter 107, splits the first band of wavelengths and the second band of wavelengths signals to different ports. Each band splitting filter 107-109 couples to a given optical transmitter in the first group of optical transmitters 101-103 and a given optical receiver in the first group of optical receivers 104-106. For example, the first band splitting filter 107 couples a spectrally sliced signal in the first band of wavelengths to the first optical transmitter 101. Thus, if the wavelength of an input optical signal is in first band of wavelengths, the output signal from the first band splitting filter 107 is passed to the port parallel to the input port. The first band splitting filter 107 couples a demultiplexed signal in the second band of wavelengths to the first optical receiver 104. Thus, in the case that the wavelength of input signal is in the second band of wavelengths, the output port is orthogonal to the input direction.

The example remote node contains a second 1×n bi-directional optical multiplexer/demultiplexer 116. The second 1×n bi-directional optical multiplexer/demultiplexer 116 connects to the central office via a single optical fiber 128. The second 1×n optical multiplexer/demultiplexer 116 multiplexes and demultiplexes bi-directionally both the broadband optical signal containing the first band of wavelengths and the broadband optical signal containing the second band of wavelengths. The second 1×n optical multiplexer/demultiplexer 116 spectrally slices the second band of wavelengths from the second broadband light source 113.

Generally, multiplexing may be the combining of multiple channels of optical information into a single optical signal. Demultiplexing may be the disassembling of the single optical signal into multiple discrete signals containing a channel of optical information. Spectral slicing may be the dividing of a band of wavelengths into small periodic lines of wavelengths.

Each example subscriber location, for example, the first subscriber location, contains a band splitting filter 117, an optical transmitter 123 to emit optical signals in the second band of wavelengths, and an optical receiver 120 to receive optical signals in the first band of wavelengths. The second multiplexer/demultiplexer 116 to demultiplex the first band of wavelengths and spectrally slice the second band of wavelengths. The second multiplexer/demultiplexer sends these signals to each band splitting filter 117-119. The band splitting filters 117-119 function to split the input signal to an output port according to the input signal band. Each optical transmitter, such as the second optical transmitter 123, receives the spectrally sliced signal in the second band of wavelengths and aligns its operating wavelength for that optical transmitter to the wavelengths within the spectrally sliced signal. Each subscriber communicates with central office with a different spectral slice within the second band of wavelengths.

A 2×2 optical coupler 115 operating in both the first band of wavelengths and the second band of wavelengths couples the first broadband light source 114 and the second broadband light source 113 to the single fiber 128. The 2×2 optical coupler 115 splits the whole second band of wavelengths emitted by the second broadband light source 113. The optical power directed into the first broadband light source 114 is terminated, while the other power propagates along the optical fiber cable so that each subscriber's optical transmitter gets the broadband of light sliced by the 1×n optical multiplexer/demultiplexer 116 at the remote node.

The first broadband light source 114, such as an amplified-spontaneous-emission source, supplies the first band of wavelengths of light to a given optical transmitter in the first group of optical transmitters 101-103 to wavelength lock the transmission wavelength of that optical transmitter. Thus, the range of operating wavelengths for the group of transmitters 101-103 in the central office is matched to the operating wavelengths of the first multiplexer/demultiplexer 112 in the central office via the injection of these spectrally sliced signals into each of these transmitters in the first group of optical transmitters 101-103. The wavelength locking of the each optical transmitter to the particular spectral slice passed through the band splitting filter solves the large power loss on up-stream signals in the 1×n optical multiplexer/demultiplexer 112 due to the wavelength detuning depending on the temperature variation in the device at the remote node. In this way, the large power loss due to the misalignment between the wavelength of the signal from an optical transmitter 101-103 and the transmission wavelength of the multiplexer/demultiplexer 112 at the central office is minimized.

Similarly, the second broadband light source 113 supplies the second band of wavelengths of light to a given optical transmitter 123-125 to wavelength lock the transmission wavelength of that optical transmitter in the second group. Thus, the operating wavelengths of the second group of transmitters 123-125 in the subscriber's local is matched to the range of operating wavelengths for the second multiplexer/demultiplexer 116 via the injection of these spectrally sliced signal into each of these transmitters in the second group of optical transmitters. The wavelength locking of the each optical transmitter to the particular spectral slice passed through the band splitting filter solves the large power loss on up-stream signals in the 1×n optical multiplexer/demultiplexer 116 due to the wavelength detuning depending on the temperature variation in the device at the remote node. In this way, the large power loss due to the misalignment between the wavelength of the signal from an optical transmitter 123-125 and the transmission wavelength of the multiplexer/demultiplexer 116 at the remote node is minimized.

Analogously, the wavelength-tracking component 130 matches the transmission wavelength of the first multiplexer/demultiplexer 112 to the transmission wavelength of a second multiplexer/demultiplexer 116. The wavelength-tracking component 130 has an electrical or optical power combiner 110. The power combiner 110 measures the strength of the output signal received from the optical receivers 104-106 at central office after the second band of wavelengths passes through the first multiplexer/demultiplexer 112. A temperature controller 111 couples to the power combiner 110. The temperature controller 111 controls the operating temperature of the optical multiplexer/demultiplexer 112 at central office. The temperature controller 111 may dither the operating temperature of the first multiplexer/demultiplexer 112 to achieve substantially a maximum power output of the power combiner 110. The maximum power output of the power combiner 110 represents substantially the best match of transmission wavelengths for both multiplexer/demultiplexers 112, 116. The power combiner 110 may measure the strength of a particular receiver or a group of receivers. The temperature controller 111 acts to control the operating wavelengths of the passband for each channel of the first multiplexer/demultiplexer 112. The mechanism to control the operating wavelengths of the passband for each channel of the first multiplexer/demultiplexer 112 may also be a strain controller, voltage controller or other similar device.

For an embodiment, an optical-passive-network consists of only non-power supplied passive optical devices without any active devices between the central office and optical subscribers. The topology structure of the optical distribution network may be a star topology that has the remote node with the optical multiplexer/demultiplexer placed near the subscribers, and plays a role to relay communications with the central office through a single optical fiber and to distribute signals to and from each of the subscribers through their own optical fiber.

As discussed, the wavelength-division-multiplexing passive-optical-network 100 may use different wavelength bands in down-stream signals, such as the first band of wavelengths, and up-stream signals, such as the second band of wavelengths. The down-stream signals may represent the signals from optical transmitters 101-103 in the central office to the subscribers and the up-stream signals may represent the signals from optical transmitters 123-125 in the subscribers to the central office. The wavelengths of the down-stream signals may be, for example, $\lambda 1, \lambda 2, \ldots \lambda n$ and the up-stream signals would be $\lambda 1^*, \lambda 2^*, \lambda n^*$ but carried in a different band of wavelengths, where $\lambda 1$ and $\lambda 1^*$ are separated by the free spectral range of the multiplexer/demultiplexer.

As discussed, the 1×n optical multiplexer/demultiplexer 116 has the function that an optical signal from a port in the left side is demultiplexed to the n number of ports in the right side. Further, the optical signals from the n-ports in the right side are multiplexed to a port in the left side simultaneously. The 1×n optical multiplexer/demultiplexer 116 spectrally slices the second band of wavelengths into narrow spectral widths of wavelengths. Because the optical multiplexer/demultiplexer can be operated on more than two bands of wavelengths, the bi-directionally propagated up-stream signals and down-stream signals in different bands can be multiplexed and demultiplexed at the same time. Each of the bands of wavelengths operated on by the optical multiplexer/demultiplexer may be offset by one or more intervals of the free spectral range of the optical multiplexer/demultiplexer.

Each optical transmitter may be directly modulated by, for example, electrical current modulation to embed information onto the specific wavelength transmitted by that optical transmitter. For an embodiment, one or more of the optical transmitters may be a Fabry-Perot semiconductor laser that are injected with the spectrum-sliced broadband incoherent light from an amplified-spontaneous-emission light source. For an embodiment, one or more of the optical transmitters may be a wavelength-seeded reflective semiconductor optical amplifier (SOA). One or more of the optical transmitters support high bit-rate modulation and long-distance transmission. A reflective SOA may also as act as the modulation device. The optical transmitters may be modulated, wavelength locked using wavelength seeding, provide signal gain for the wavelengths within the spectral slice and increase the extinction ratio between the injected wavelengths and wavelengths outside the spectral slice.

For an embodiment, a broadband light source may be a light source based on semiconductor optical amplifiers, a light source based on rare-earth ion-doped optical fiber amplifiers, a light emitting diode, or similar device. The broadband light source may provide light with any kind of characteristic such as coherent or incoherent light.

For an embodiment, an optical multiplexer/demultiplexer can be achieved by an arrayed waveguide grating including an integrating waveguide grating, a device using thin-film filters, a diffraction grating, or similar device. The optical multiplexer/demultiplexer can also be a dielectric interference filter or similar device.

For an embodiment, a wavelength-seeded optical source injected with the incoherent light minimizes the loss of a portion of a signal because of the characteristic of a multiplexer/demultiplexer to pass only wavelengths within a set channel passband. The wavelength tracking of the operating wavelengths of both of the multiplexer/demultiplexers assists in minimizing due to wavelength misalignment between these devices.

Figure 2:
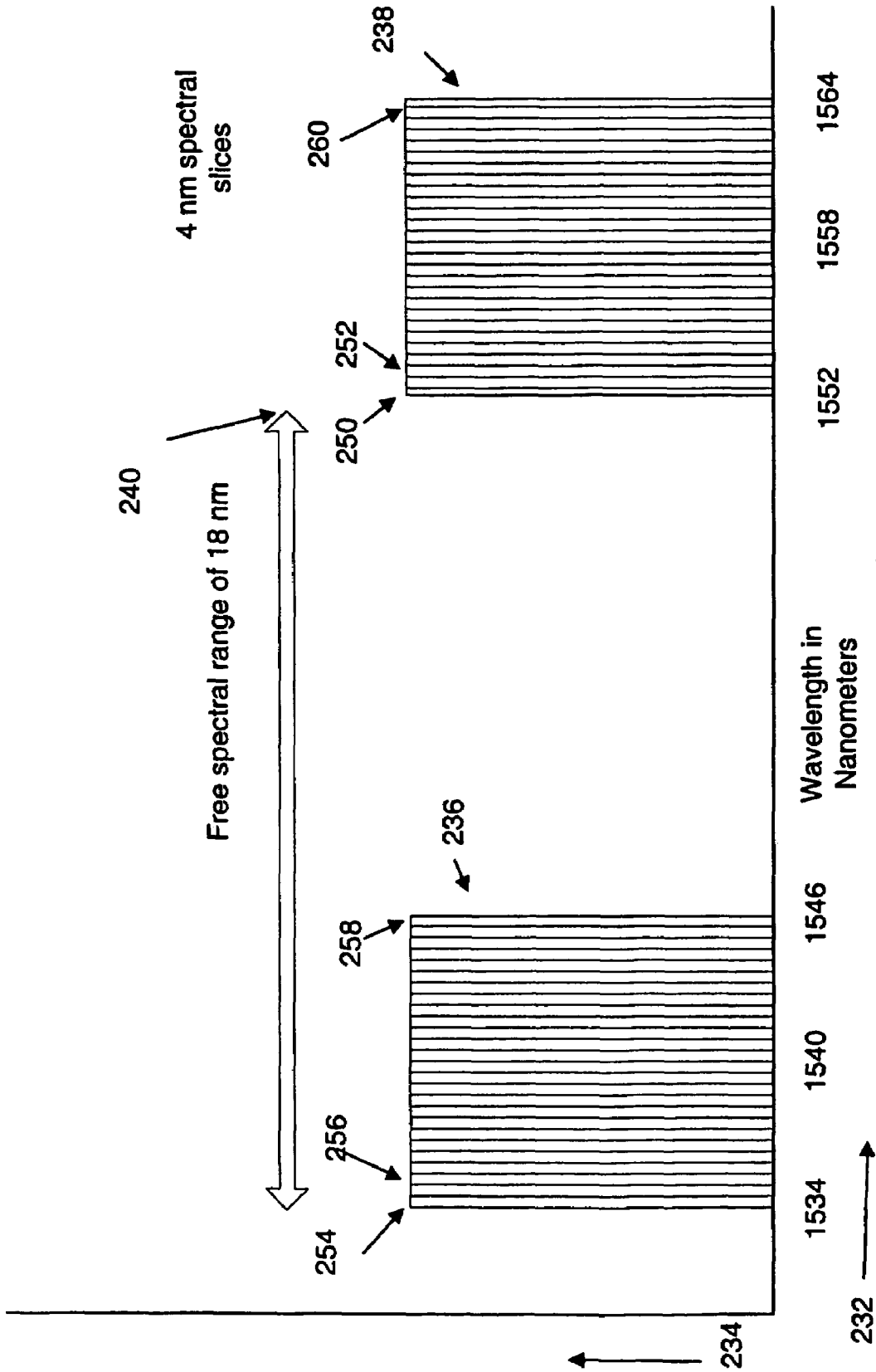
FIG. 2 illustrates a graph of an exemplary first band of wavelengths and a second band of wavelengths.

FIG. 2 illustrates a graph of an exemplary first band of wavelengths and a second band of wavelengths. The graph shows wavelengths 232 in nanometers horizontally across the graph and optical power 234 of a particular wavelength vertically. The example first band of wavelengths 236 spans from 1534 nanometers to 1546 nanometers with a center wavelength of 1540. The example second band of wavelengths 238 spans from 1552 nanometers to 1564 nanometers with a center wavelength of 1558. A free spectral range 240 of approximately 18 nanometers separates the wavelengths within the two bands of wavelengths 236, 238. For example, $\lambda 1^*$ at 1552 nanometers is offset from $\lambda 1$ at 1534 nanometers by 18 nanometers. The example $\lambda n^*$ at 1564 is offset from $\lambda n$ by 18 nanometers. The optical multiplexer/demultiplexer in the remote node spectrally slices the second band of wavelengths 238 into, for example, 0.4 nanometer spectral slices. Each different spectral slice is output via a different port in the multiplexer/demultiplexer to an individual subscriber.

For example, a first spectral slice 250 in the second band of wavelengths may go to the optical transmitter in subscriber number 1. The second spectral slice 252 the second band of wavelengths may go to the optical transmitter in subscriber number 2. Through the wavelength-seeding, the optical transmitter wavelength locks with the first spectral slice 250 in the second band of wavelengths. The optical transmitter aligns and provides lasing action for the wavelengths in the first spectral slice 250. Further, the optical multiplexer/demultiplexer in the remote node may demultiplex the downstream channels from the optical multiplexer in the central office. The first channel 254 in the first band of wavelengths 236 may be demultiplexed to a band splitting filter and the optical receiver in subscriber number 1. The second channel 256 in the first band of wavelengths 236 may be demultiplexed to a band splitting filter and the optical receiver in subscriber number 2.

For an embodiment, the first band of wavelengths may be a standard band of wavelengths designated for telecommunications, such as the C band 1525-1560 nanometers. The second band of wavelengths may be a standard band of wavelengths designated for telecommunications that differs from the standard band of wavelengths designated for telecommunications being used by the first band of wavelengths, such as the L band 1570-1620 nanometers.

Alternatively, the second band of wavelengths may be a band of wavelengths having a wavelength offset of a free spectral range between 5-100 nanometers. The spectral separation between the first band of wavelengths and the second band of wavelengths should be great enough to prevent the occurrence of interference between the filtered spectrally sliced downstream signal to a subscriber and the filtered upstream signal from that subscriber.

Figure 3:
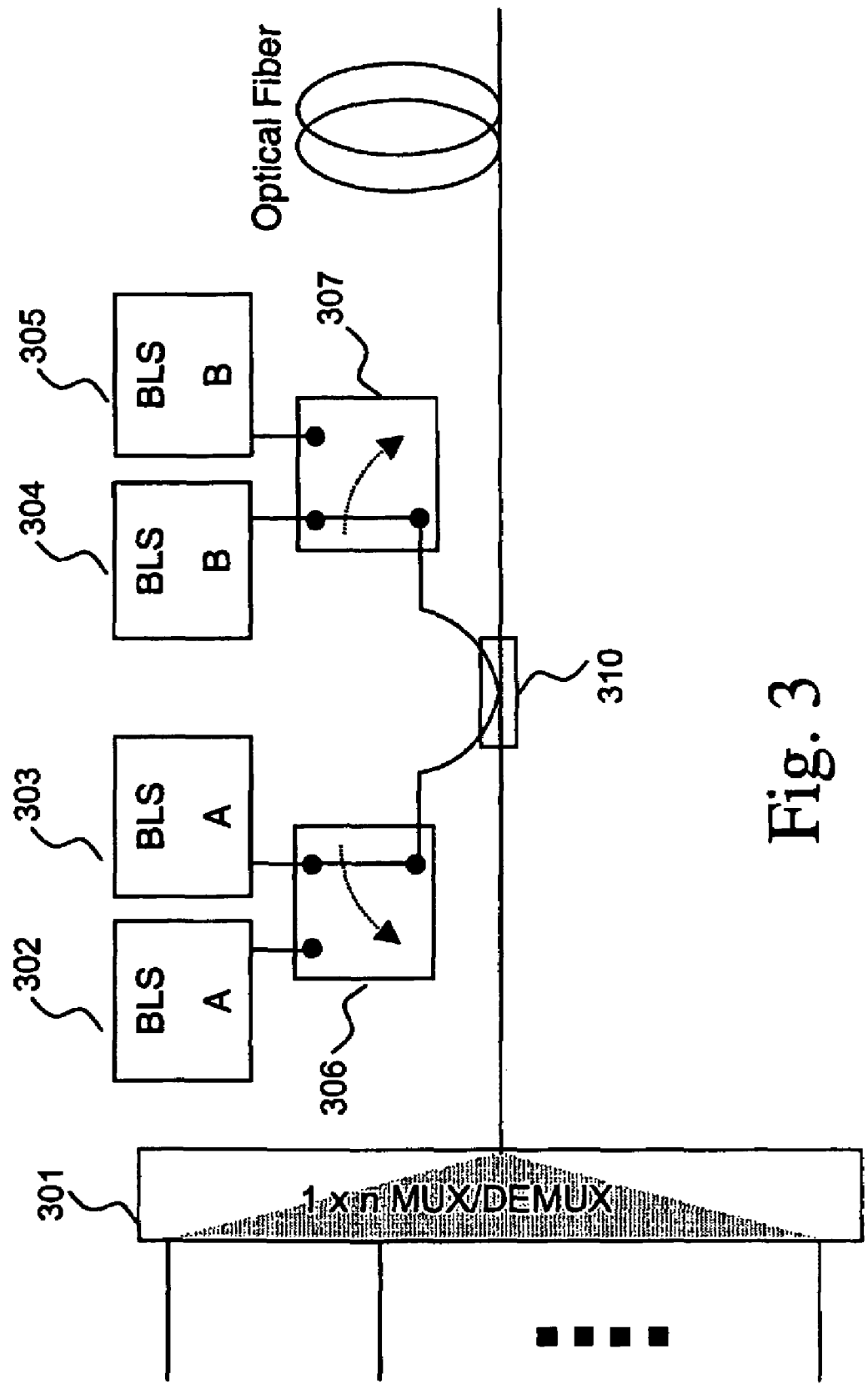
FIG. 3 illustrates a block diagram of an embodiment of a protection device against degradation of the passive-optical-network when a fault occurs in either the first broadband light source or the second broadband light source.

FIG. 3 illustrates a block diagram of an embodiment of a protection device against degradation of the passive-optical-network when a fault occurs in either the first broadband light source or the second broadband light source. When a fault in the first broadband light source or the optical signal containing the first band of wavelengths 303 is detected, for instance, a 1×2 optical switch 306 changes the path from the first broadband light source to an alternate optical signal containing the first band of wavelengths such as the third broadband light source 302. Also, a 1×2 optical switch 307 may switch the broadband light source from the second band light source 304 to the fourth broadband light source 305. Each broadband light source 302-305 may have an isolator to prevent signals coming from the optical coupler to enter that broadband light source.

Figure 4A:
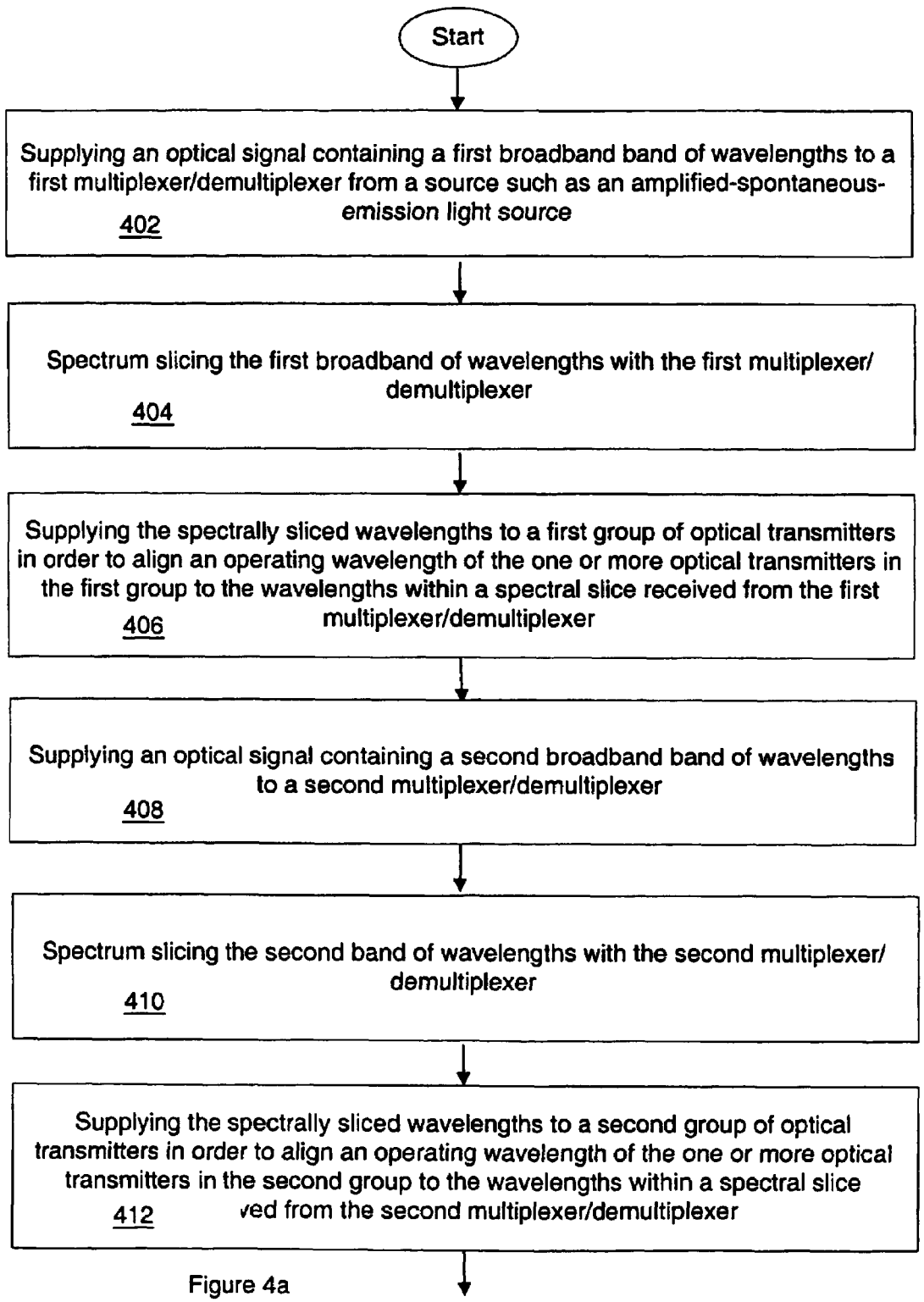
FIGS. 4a and 4b illustrate a flow diagram of an embodiment of the wavelength-division-multiplexing passive-optical-network.
Figure 4B:
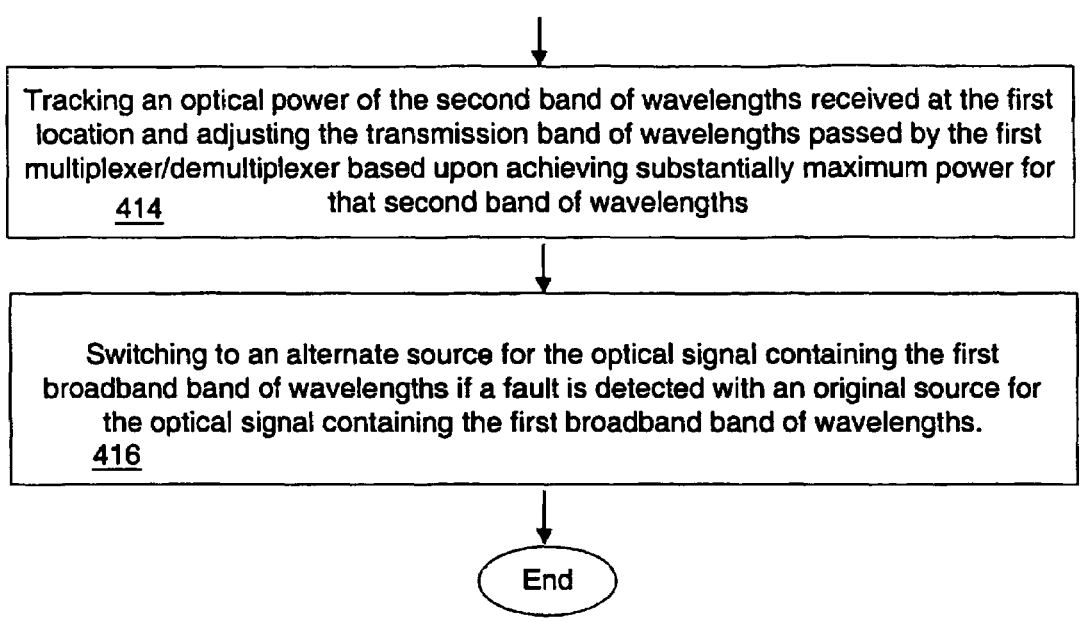

FIGS. 4a and 4b illustrate a flow diagram of an embodiment of the wavelength-division-multiplexing passive-optical-network. For an embodiment, the passive-optical-network passes upstream and down-stream signals between a first location and a second location remote from the first location.

In block 402, the passive-optical-network supplies an optical signal containing a first broadband band of wavelengths to a first multiplexer/demultiplexer from a source such as an amplified-spontaneous-emission light source.

In block 404, the passive-optical-network spectrum slices the first broadband of wavelengths with the first multiplexer/demultiplexer.

In block 406, the passive-optical-network supplies the spectrally sliced wavelengths to a first group of optical transmitters in order to control the transmission output wavelength in the first band of wavelengths that is generated by one or more optical transmitters in the first group. Each optical transmitter self-aligns the operating wavelength of that optical transmitter to the wavelengths within a spectral slice received from the first multiplexer/demultiplexer.

For an embodiment, the transmitters in a first location, such as a supervisory node, generate the down-stream signals. The down-stream signals pass through its band splitting filter. The 1×n optical multiplexer/demultiplexer in the supervisory node wavelength-division multiplexes the down stream signals. An n×n optical coupler splits those downstream signals. The signals forced into the first broadband light source are terminated, while the other signals are bound for each optical subscriber after being demultiplexed by the 1×n optical multiplexer/demultiplexer located at the remote node. At the subscriber side, the signals are passed through band splitting filter and reach the optical receivers.

In block 408, the passive-optical-network supplies a broadband optical signal containing a second band of wavelengths to a second multiplexer/demultiplexer.

In block 410, the passive-optical-network spectrally slices the second broadband of wavelengths with the second multiplexer/demultiplexer.

In block 412, the passive-optical-network supplies the spectrally sliced wavelengths to a second group of optical transmitters in order to control the transmission output wavelength in the second band of wavelengths that is generated by one or more optical transmitters in the second group. Each optical transmitter self-aligns the operating wavelength of that optical transmitter to the wavelengths within a spectral slice received from the second multiplexer/demultiplexer. The first multiplexer/demultiplexer may be located in a first location such as supervisory node and the second multiplexer/demultiplexer may be located in a second location remote from the first location, such as a remote node.

For an embodiment, the upstream-signals depart from the optical transmitters in the subscriber side, pass through band splitting filters and are multiplexed by a 1×n optical multiplexer/demultiplexer at the remote node. The n×n optical coupler splits the multiplexed signals after passing through the optical fiber cable. The upstream signals split into the second broadband light source 113 are terminated, while the other up-stream signals continue to propagate to optical receivers at the supervisory node via a 1×n optical multiplexer/demultiplexer.

In block 414, the passive-optical-network tracks the optical power of the second band of wavelengths received at the first location after passing through the first multiplexer/demultiplexer and adjusts the transmission band of wavelengths passed by the first multiplexer/demultiplexer based upon achieving substantially maximum power for that second band of wavelengths.

In block 416, the passive-optical-network may switch to an alternate source for the optical signal containing the first broadband band of wavelengths if a fault is detected with an original source for the optical signal containing the first broadband band of wavelengths. Similarly, the passive-optical-network may switch to an alternate source for the optical signal containing the second broadband band of wavelengths if a fault is detected with an original source for the optical signal containing the second broadband band of wavelengths.

Note, the specific numeric reference should not be interpreted as a literal sequential order but rather interpreted that the first band of wavelength is different than a second band of wavelengths. Thus, the specific details set forth are merely exemplary.

In the forgoing specification, the invention has been described with reference to specific exemplary embodiments thereof. It will, however, be evident that various modifications and changes may be made thereto without departing from the broader spirit and scope of the invention as set fourth in the appended claims. For example, a single device may provide the function of both the first broadband light source and the second broadband light source; the WDM PON may use more than two different bands of wavelengths; each multiplexer/demultiplexer may be an athermal an arrayed waveguide grating; an optical transmitter may be operated continuous wave and modulated by an external modulator, etc. The specification and drawings are, accordingly, to be regarded in an illustration rather then a restrictive sense.

We claim:

1. A method, comprising:
    supplying a first optical stream containing a first band of wavelengths to a first multiplexer/demultiplexer in a first direction;
    spectrum slicing the first optical stream containing the first band of wavelengths with the first multiplexer/demultiplexer to provide first spectral slices of the first optical stream within the first band of wavelengths;
    supplying the first spectral slices within the first band of wavelengths in the first direction to a first group of optical transmitters in order to align first operating wavelengths of the optical transmitters in the first group within the first spectral slices received from the first multiplexer/demultiplexer to provide a third optical stream containing first optical channels within the first band of wavelength that propagates in a second direction; multiplexing the first optical channels to provide multiplexed first optical channels to a second multiplexer/demultiplexer;

supplying a second optical stream containing a second band of wavelengths to the second multiplexer/demultiplexer in the second direction;

spectrum slicing the second optical stream containing the second band of wavelengths with the second multiplexer/demultiplexer to provide second spectral slices of the second optical stream within the second band of the wavelengths; and supplying the second spectral slices within the second band of wavelengths in the second direction to a second group of optical transmitters in order to align second operating wavelengths of the optical transmitters in the second group within the second spectral slices received from the second multiplexer/demultiplexer to provide a fourth optical stream containing second optical channels within the second band of wavelength that propagates in the first direction to multiplex by the second multiplexer/demultiplexer, combining a plurality of optical signals in the second band of wavelengths received at a first location after passing through the first multiplexer/demultiplexer; and adjusting the transmission band of wavelengths passed by the first multiplexer/demultiplexer based upon achieving substantially maximum power of the combined plurality of optical signals in the second band of wavelengths, wherein the first multiplexer/demultiplexer spectrum slices the first optical stream and multiplexes the first optical channels of the third optical stream while demultiplexing the second optical channels of the fourth optical stream.

2. The method of claim 1, wherein the first multiplexer/demultiplexer is located in a first location and the second multiplexer/demultiplexer is located in a second location remote from the first location.

3. The method of claim 1, further comprising:
switching to an alternate source for the first optical stream containing the first band of wavelengths, which is a first broadband, if a fault is detected with an original source for the first optical stream containing the first broadband band of wavelengths.

4. An apparatus, comprising:
means for supplying a first optical stream containing a first band of wavelengths to a first multiplexer/demultiplexer in a first direction;

means for spectrum slicing the first optical stream containing the first band of wavelengths with the first multiplexer/demultiplexer to provide first spectral slices of the first optical stream within the first band of wavelengths;

means for supplying the first spectral slices within the first band of wavelengths in the first direction to a first group of optical transmitters in order to align first operating wavelengths of the optical transmitters in the first group within the first spectral slices received from the first multiplexer/demultiplexer to provide a third optical stream containing first optical channels within the first band of wavelength that propagates in a second direction;

means for multiplexing the first optical channels to provide multiplexed first optical channels to a second multiplexer/demultiplexer;

means for supplying a second optical stream containing a second band of wavelengths to a second multiplexer/demultiplexer in the second direction;

means for spectrum slicing the second optical stream containing the second band of wavelengths with the second multiplexer/demultiplexer to provide second spectral slices within the second band of the wavelengths; and means for supplying the second spectral slices within the second band of wavelengths in the second direction to a second group of optical transmitters in order to align second operating wavelengths of the optical transmitters in the second group within the second spectral slices received from the second multiplexer/demultiplexer to provide a fourth optical stream containing second optical channels within the second band of wavelength that propagates in the first direction to multiplex by the second multiplexer/demultiplexer;

means for combining a plurality of optical signals in the second band of wavelengths after passing through the first multiplexer/demultiplexer; and means for adjusting the transmission band of wavelengths passed by the first multiplexer/demultiplexer based upon achieving substantially maximum power of the combined plurality of optical signals in the second band of wavelengths, wherein the first multiplexer/demultiplexer spectrum slices the first optical stream and multiplexes the first optical channels while demultiplexing the second optical channels.

5. The apparatus of claim 4, wherein the first multiplexer/demultiplexer is located in a first location and the second multiplexer/demultiplexer is located in a second location remote from the first location.

6. The apparatus of claim 4, further comprising:
means for switching to an alternate source for the first optical stream containing the first band of wavelengths, which is a first broadband, if a fault is detected with an original source for the first optical stream containing the first broadband band of wavelengths.

7. A system, comprising:
a first broadband light source that supplies a first optical stream containing a first band of wavelengths in a first direction;

a second broadband light source that supplies a second optical stream containing a second band of wavelengths in a second direction, wherein the second band of wavelengths is different and separate from the first band of wavelengths;

a first plurality of optical transmitters that receives first spectral slices of the first band of wavelengths of the first optical stream to transmit a third optical stream containing first optical channels within the first band of wavelengths in the second direction;

a second plurality of optical transmitters that receives second spectral slices of the second band of wavelengths of the second optical stream to transmit a fourth optical stream containing second optical channels within the second band of wavelengths in the first direction; and a first optical multiplexer/demultiplexer that spectrally slices the first band of wavelengths of the first optical stream to provide the first spectral slices to the first plurality of optical transmitters, multiplexes the first optical channels propagating in the second direction while demultiplexing the second optical channels within the second band of wavelengths propagating in the first direction;

a second optical multiplexer/demultiplexer that spectrally slices the second band of wavelengths of the second optical stream to provide the second spectral slices to the second plurality of optical transmitters, multiplexes the second optical channels propagating in the first direction, while demultiplexing the first optical channels propagating in the second direction;

a wavelength tracking component having a power combiner to measure the strength of the second band of wavelengths after passing through the first optical multiplexer/demultiplexer, and a temperature controller to control an operating temperature of the first optical multiplexer/demultiplexer to maximize the output of the power combiner.

8. The system of claim 7, further comprising:
a third broadband light source, and
an optical switch to couple the third broadband light source to a fiber if a fault is detected in the first broadband light source.

9. An apparatus, comprising:
a first broadband light source that supplies a first optical stream containing a first band of wavelengths;
a second broadband light source that supplies a second optical stream containing a second band of wavelengths, wherein the second band of wavelengths is different and separate from the first band of wavelengths;
a first optical multiplexer/demultiplexer to spectrally slice the first band of wavelengths of the first optical stream to provide first spectral slices;
a first optical transmitter that receives one of the first spectral slices of the first band of wavelengths of the first optical stream to transmit a first optical signal of a third optical stream within the first band of wavelengths in a second direction;
a second optical multiplexer/demultiplexer to spectrally slice the second band of wavelengths of the second optical stream to provide second spectral slices;
a second optical transmitter that receives one of the second spectral slices of the second band of wavelengths of the second optical stream to transmit a second optical signal of a fourth optical stream within the second band of wavelengths in a first direction;
a first optical receiver coupled to receive the second optical signal from the second optical transmitter;
a second optical receiver coupled to receive the first optical signal from the first optical transmitter;
a wavelength tracking component having a power combiner to measure the strength of the second band of wavelengths after passing through the first multiplexer/demultiplexer, wherein the wavelength tracking component matches a transmission wavelength of the first multiplexer/demultiplexer to the transmission wavelength of the second multiplexer/demultiplexer based on the measuring.

10. The apparatus of claim 9 further comprising
a first band splitting filter to couple a spectrally sliced signal in the first band of wavelengths to a first port coupled to the first optical transmitter, and to couple a demultiplexed signal in the second band of wavelengths to a second port coupled to the first optical receiver.

11. The apparatus of claim 9, wherein the first optical multiplexer/demultiplexer multiplexes first optical channels within the first band of wavelengths propagating in the second direction while demultiplexing second optical channels within the second band of wavelengths propagating in the first direction.

12. The apparatus of claim 9, wherein
the second optical multiplexer/demultiplexer multiplexes second optical channels within the second band of wavelengths propagating in the first direction while demultiplexing first optical channels within the first band of wavelengths propagating in the second direction.

13. The apparatus of claim 11, wherein the first optical multiplexer/demultiplexer is an arrayed waveguide grating.

14. The apparatus of claim 9, wherein the first optical transmitter is located in a first location and the second optical transmitter is located in a second location remote from the first location.

15. The apparatus of claim 9, wherein the first broadband light source is a light source based on a semiconductor optical amplifier.

16. The apparatus of claim 9, wherein the first broadband light source is a light source based on an optical fiber amplifier.

17. The apparatus of claim 9, wherein the first broadband light source is a light emitting diode.

18. The apparatus of claim 9, wherein the first optical transmitter is a Fabry Perot laser diode.

19. The apparatus of claim 9, wherein the first optical transmitter is a reflective semiconductor amplifier.

20. The apparatus of claim 9, further comprising:
a third broadband light source, and
an optical switch to couple the third broadband light source to the first optical transmitter if a fault is detected in the first broadband light source.

21. The apparatus of claim 9, wherein the first band of wavelengths comprises a C band of wavelengths designated for telecommunications.

22. The apparatus of claim 9, wherein the second band of wavelengths comprises an L band of wavelengths designated for telecommunications.

23. The apparatus of claim 9, wherein the second band of wavelengths comprises a band of wavelengths having a spectral separation of between 5-100 nanometers apart from a peak wavelength of the first band of wavelengths.

24. A system, comprising:
a first broadband light source that supplies a first optical stream containing a first band of wavelengths in a first direction;
a second broadband light source that supplies a second optical stream containing a second band of wavelengths in a second direction, wherein the second band of wavelengths is different and separate from the first band of wavelengths;
a first plurality of optical transmitters that receives first spectral slices of the first band of wavelengths of the first optical stream to transmit a third optical stream containing first optical channels within the first band of wavelengths in the second direction;
a second plurality of optical transmitters that receives second spectral slices of the second band of wavelengths of the second optical stream to transmit a fourth optical stream containing second optical channels within the second band of wavelengths in the first direction; and
a first multiplexer/demultiplexer that spectrally slices the first band of wavelengths of the first optical stream to provide the first spectral slices to the first plurality of optical transmitters, multiplexes the first optical channels propagating in the second direction while demultiplexing the second optical channels within the second band of wavelengths propagating in the first direction;

a second multiplexer/demultiplexer that spectrally slices the second band of wavelengths of the second optical stream to provide the second spectral slices to the second plurality of optical transmitters, multiplexes the second optical channels propagating in the first direction, while demultiplexing the first optical channels propagating in the second direction; and a wavelength tracking component having a power combiner to measure the strength of the second band of wavelengths after passing through the first multiplexer/demultiplexer, wherein the wavelength tracking component matches a transmission wavelength of the first multiplexer/demultiplexer to the transmission wavelength of the second multiplexer/demultiplexer based on the measuring.

25. The system of claim 24, further comprising:
a third broadband light source, and
an optical switch to couple the third broadband light source to a fiber if a fault is detected in the first broadband light source.

26. The system of claim 24 further comprising
a first band splitting filter to couple a spectrally sliced signal in the first band of wavelengths to a first port coupled to a first optical transmitter of the first plurality of optical transmitters, and to couple a demultiplexed signal in the second band of wavelengths to a second port coupled to an optical receiver.

27. The system of claim 24, wherein the first optical multiplexer/demultiplexer is an arrayed waveguide grating.

28. The system of claim 24, wherein the first broadband light source is a light source based on a semiconductor optical amplifier.

29. The system of claim 24, wherein the first broadband light source is a light source based on an optical fiber amplifier.

30. The system of claim 24, wherein the first broadband light source is a light emitting diode.

31. The system of claim 24, wherein the first plurality of optical transmitters includes a Fabry Perot laser diode.

32. The system of claim 24, wherein the first plurality of optical transmitters includes a reflective semiconductor amplifier.

33. The system of claim 24, further comprising:
a third broadband light source, and
an optical switch to couple the third broadband light source to the first optical transmitter if a fault is detected in the first broadband light source.

34. A method, comprising:
supplying a first optical stream containing a first band of wavelengths to a first multiplexer/demultiplexer in a first direction;
spectrum slicing the first optical stream containing the first band of wavelengths with the first multiplexer/demultiplexer to provide first spectral slices of the first optical stream within the first band of wavelengths;
supplying the first spectral slices within the first band of wavelengths in the first direction to a first group of optical transmitters in order to align first operating wavelengths of the optical transmitters in the first group within the first spectral slices received from the first multiplexer/demultiplexer to provide a third optical stream containing first optical channels within the first band of wavelength that propagates in a second direction; multiplexing the first optical channels to provide multiplexed first optical channels to a second multiplexer/demultiplexer;
supplying a second optical stream containing a second band of wavelengths to the second multiplexer/demultiplexer in the second direction;
spectrum slicing the second optical stream containing the second band of wavelengths with the second multiplexer/demultiplexer to provide second spectral slices of the second optical stream within the second band of the wavelengths; and
supplying the second spectral slices within the second band of wavelengths in the second direction to a second group of optical transmitters in order to align second operating wavelengths of the optical transmitters in the second group within the second spectral slices received from the second multiplexer/demultiplexer to provide a fourth optical stream containing second optical channels within the second band of wavelength that propagates in the first direction to multiplex by the second multiplexer/demultiplexer,
tracking a combined power of a plurality of optical signals in the second band of wavelengths after passing through the first multiplexer/demultiplexer and matching a transmission wavelength of the first multiplexer/demultiplexer to the transmission wavelength of the second multiplexer/demultiplexer based on the tracking,
wherein the first multiplexer/demultiplexer spectrum slices the first optical stream and multiplexes the first optical channels of the third optical stream while demultiplexing the second optical channels of the fourth optical stream.

35. The method of claim 34, further comprising:
switching to an alternate source for the first optical stream containing the first band of wavelengths, which is a first broadband band, if a fault is detected with an original source for the first optical stream containing the first broadband band of wavelengths.

36. The method of claim 34, further comprising:
adjusting a transmission wavelength passed by the first multiplexer/demultiplexer based upon achieving a substantially maximum of the combined power of the plurality of optical signals in the second band of wavelengths.

* * * * *